United States Patent
McCormack et al.

(10) Patent No.: US 9,525,776 B2
(45) Date of Patent: Dec. 20, 2016

(54) SYSTEM AND METHOD FOR MANAGING ENTERPRISE COMMUNICATIONS

(71) Applicant: Avaya Inc., Santa Clara, CA (US)

(72) Inventors: Tony McCormack, Galway (IE); Neil O'Connor, Galway (IE); John McGreevy, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/590,330

(22) Filed: Jan. 6, 2015

(65) Prior Publication Data

US 2016/0198047 A1 Jul. 7, 2016

(51) Int. Cl.
| | | |
|---|---|---|
| H04M 3/00 | (2006.01) | |
| H04M 5/00 | (2006.01) | |
| H04M 3/51 | (2006.01) | |
| G06Q 30/00 | (2012.01) | |

(52) U.S. Cl.
CPC ......... *H04M 3/5175* (2013.01); *G06Q 30/016* (2013.01); *H04M 3/5183* (2013.01)

(58) Field of Classification Search
CPC ........ G10L 15/00; G06Q 10/06; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 2203/2011; H04M 2203/2061; H04M 2242/00; H04M 2242/08; H04M 2242/12

USPC ........................ 379/265.01, 265.02, 265.03, 265.04,379/265.05, 265.06, 265.07, 265.08, 265.09,379/265.1, 265.11, 265.12, 265.13, 265.14,379/266.01, 266.02, 266.03, 266.04, 266.05,379/266.06, 266.07, 266.08, 266.09, 266.1
See application file for complete search history.

(56) References Cited

U.S. PATENT DOCUMENTS

| | | | | |
|---|---|---|---|---|
| 6,957,114 B1 * | 10/2005 | Logsdon | .......... | G05B 19/41865 700/100 |
| 8,885,798 B2 * | 11/2014 | Peterson | ............. | H04M 3/5175 379/88.09 |
| 9,172,808 B2 * | 10/2015 | Zeppenfeld | ........... | H04M 3/523 |
| 9,178,999 B1 * | 11/2015 | Hegde | ................. | H04M 3/5175 |
| 2002/0194002 A1 * | 12/2002 | Petrushin | ................ | G10L 17/26 704/270 |
| 2006/0188075 A1 * | 8/2006 | Peterson | ............... | H04M 3/487 379/67.1 |
| 2007/0025528 A1 * | 2/2007 | Knott | ...................... | H04M 3/10 379/32.01 |

(Continued)

*Primary Examiner* — Khai N Nguyen (57) ABSTRACT

A response managing system for managing at least one communication session in an enterprise is disclosed. The response managing system includes a monitoring module for monitoring one or more parameters associated with the at least one communication session between a customer and a resource, wherein the resource provides one or more responses to the customer. The response managing system further includes a database for storing the one or more monitored parameters. The response managing system further includes a processing module for processing the one or more stored parameters to determine one or more characteristics of the customer. The response managing system further includes a response preparation module for preparing one or more responses based on the one or more determined characteristics.

15 Claims, 6 Drawing Sheets

(56) References Cited

U.S. PATENT DOCUMENTS

| | | | |
|---|---|---|---|
| 2007/0140448 A1* | 6/2007 | Lin | H04M 7/128 379/93.17 |
| 2009/0192838 A1* | 7/2009 | Bangalore | G06Q 10/06 705/7.13 |
| 2009/0245500 A1* | 10/2009 | Wampler | H04M 3/42382 379/265.09 |
| 2011/0055186 A1* | 3/2011 | Gopalakrishnan | G06F 17/30867 707/706 |
| 2012/0173229 A1* | 7/2012 | Peterson | H04M 3/487 704/200 |
| 2012/0271898 A1* | 10/2012 | Bangalore | G06Q 10/06 709/206 |
| 2013/0003943 A1* | 1/2013 | Munns | H04M 3/5166 379/88.01 |
| 2013/0073473 A1* | 3/2013 | Heath | G06Q 30/02 705/319 |
| 2013/0083903 A1* | 4/2013 | Peterson | H04M 3/487 379/88.08 |
| 2013/0159054 A1* | 6/2013 | Evans | G06Q 30/0202 705/7.31 |
| 2014/0244530 A1* | 8/2014 | Baldwin | G06Q 50/01 705/319 |
| 2014/0254778 A1* | 9/2014 | Zeppenfeld | H04M 3/523 379/88.02 |
| 2014/0310001 A1* | 10/2014 | Kalns | G06Q 30/06 704/270.1 |
| 2014/0317030 A1* | 10/2014 | Shen | G06Q 30/01 706/12 |
| 2015/0139416 A1 | 5/2015 | Skiba et al. | |
| 2015/0319307 A1* | 11/2015 | Govindarajan | H04M 3/523 379/265.02 |

* cited by examiner

SYSTEM AND METHOD FOR MANAGING ENTERPRISE COMMUNICATIONS

BACKGROUND

Field

Embodiments of the present invention generally relate to a system and method to manage customer-resource communications and particularly to a system and method for managing customer-resource communications in real time.

Description of Related Art

Contact centers are employed by many enterprises to service, inbound and outbound contacts or customers. A primary objective of contact center management is to ultimately maximize contact center performance and profitability. An ongoing challenge in contact center administration is monitoring and optimizing contact center efficiency usage of its available resources. The contact center efficiency is generally measured by metrics such as Service Level Agreement (SLA), Customer Satisfaction (CSAT), and match rate.

Match rate is another indicator used in measuring the contact center efficiency. Match rate is usually determined by dividing the number of contacts accepted by a primary skill level resource within a period of time by the number of contacts accepted by any resource in a queue over the same period. A resource with a primary skill level is one who typically may handle contacts of a certain nature more effectively and/or efficiently as compared to a resource of lesser skill level. There are other contact center resources that may not be as proficient as the primary skill level resource, and those resources are identified either as skill level resources or backup skill level resources. As can be appreciated, contacts received by a primary skill level resource are typically handled more quickly and accurately or effectively (e.g., higher revenue attained) than a contact received by a secondary or even backup skill level resource. Thus, it is an objective of most contact centers to optimize match rate along with the service level.

The contact center also has to maintain the Customer Satisfaction (CSAT) metrics. For this purpose, resources may have to maintain the quality of services provided to the customers through multimedia (e.g., voice contacts, video contacts, emails, etc.). Providing an optimum quality of service is majorly governed by interactions or conversations between a customer and a resource. These involve conversation styles, facial expressions, personality types of individuals etc. A well known method for defining personality types includes Myers Briggs Type Indicator (MBTI). An example could include a thinking-type and a feeling-type personality, where a thinking-type makes a decision based on facts while a feeling-type makes a decision on a situation-to-situation basis or applies a best fit approach.

Generally, contact centers deploy an Automatic Call Distributer (ACD) to route incoming calls from customers to resources. The operation of the ACD involves various routing algorithms to match a customer with a resource. A commonly used routing algorithm is behavioral routing, where incoming calls from the customers are routed to resources in a contact center based on behavior and personalities of the customers known from past experiences or pre-stored previous interactions with the contact center resources. Situations often exist where an appropriate resource complementing the personality of the customer is not available based on behavioral routing and the call is routed to another resource using a different routing algorithm. Then a problem arises as the customer having a personality type is connected to a resource proficient in handling customers of a different personality type. The resource is then not able to handle the conversation in an efficient manner and needs assistance in responding to queries of the customer according to the customer's personality or conversational style.

Few technologies exist that assist resources in preparing responses to customer queries. However, these technologies merely take into account only contextual parameters of a query. For example, such technologies identify key words from a customer query and suggest possible pre-defined solutions to the resources. These technologies fail to take into account behavioral characteristics or personality types of the customer. For example, words spoken or written in a conversation by a customer may reflect a current behavior such as angry, frustrated, irritated or happy, satisfied, etc. Also, there may be several behavioral turns in a conversation between a customer and a resource. An example of such a behavioral turn would be from a state of agreement to a state of disagreement leading to an argument. Therefore, it becomes essential to monitor the customer's behavior during conversations to achieve customer satisfaction and desired business goals.

Therefore, a need exists for an efficient way of handling customer-resource interactions to achieve enterprise business goals.

SUMMARY

Embodiments in accordance with the present invention provide a response managing system for managing at least one communication session in an enterprise. The response managing system includes a monitoring module for monitoring one or more parameters associated with the at least one communication session between a customer and a resource, wherein the resource provides one or more responses to the customer. The system further includes a database for storing the one or more monitored parameters. The system further includes a processing module for processing the one or more stored parameters to determine one or more characteristics of the customer. The system further includes a response preparation module for preparing one or more responses based on the one or more determined characteristics.

Embodiments in accordance with the present invention further provide a computer-implemented method for managing at least one communication session in an enterprise. The method includes monitoring one or more parameters associated with the at least one communication session between a customer and a resource, wherein the resource provides one or more responses to the customer; storing the one or more monitored parameters in a database; processing the one or more stored parameters to determine one or more characteristics of the customer; and preparing the one or more responses based on the one or more determined characteristics.

Embodiments in accordance with the present invention further provide a computer-implemented method for managing one or more communication sessions in an enterprise. The method includes receiving one or more queries from a customer in the one or more communication sessions; monitoring one or more parameters associated with the one or more queries; storing the one or more monitored parameters; processing the one or more stored parameters to determine at least one personality type of the customer; preparing one or more responses for the resource in the one or more communication sessions based on the one or more determined personality types; and transmitting the one or more prepared responses to the customer.

Embodiments of the present invention may provide a number of advantages depending on its particular configuration. First, embodiments of the present application provide a system and a method for managing and optimizing communication session between a customer and a resource in an enterprise. Embodiments of the present application provide a mechanism to increase outcome or productivity from a conversation between the customer and the resource. Next, embodiments of the present application allow an enterprise to gain business value.

Further, embodiments of the present invention adjust responses of a resource to best complement personality of a customer. Next, the system increases productivity of a resource by preparing responses based on personalities of customers. Further, embodiments of the present invention ensure responses are appreciated by the customers and thereby increasing customer satisfaction level.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

The terms "customer" and "contact" may be used interchangeably in certain context of this disclosure of the present invention when referring to one or more persons/entity contacting a contact center, usually to reach an IVR system and/or one or more resources for assistance. In another context contemplated by the present invention, a "customer" may have more than one contact with the contact center at, or nearly at, the same time. For example, a customer may communicate with a contact center by way of telephone and by way of a chat, thus counting as one customer but two contacts.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, embodiments may include a tangible storage medium or distribution medium and prior art-recognized equivalents and successor media, in which the software embodiments of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

Figure 1A:
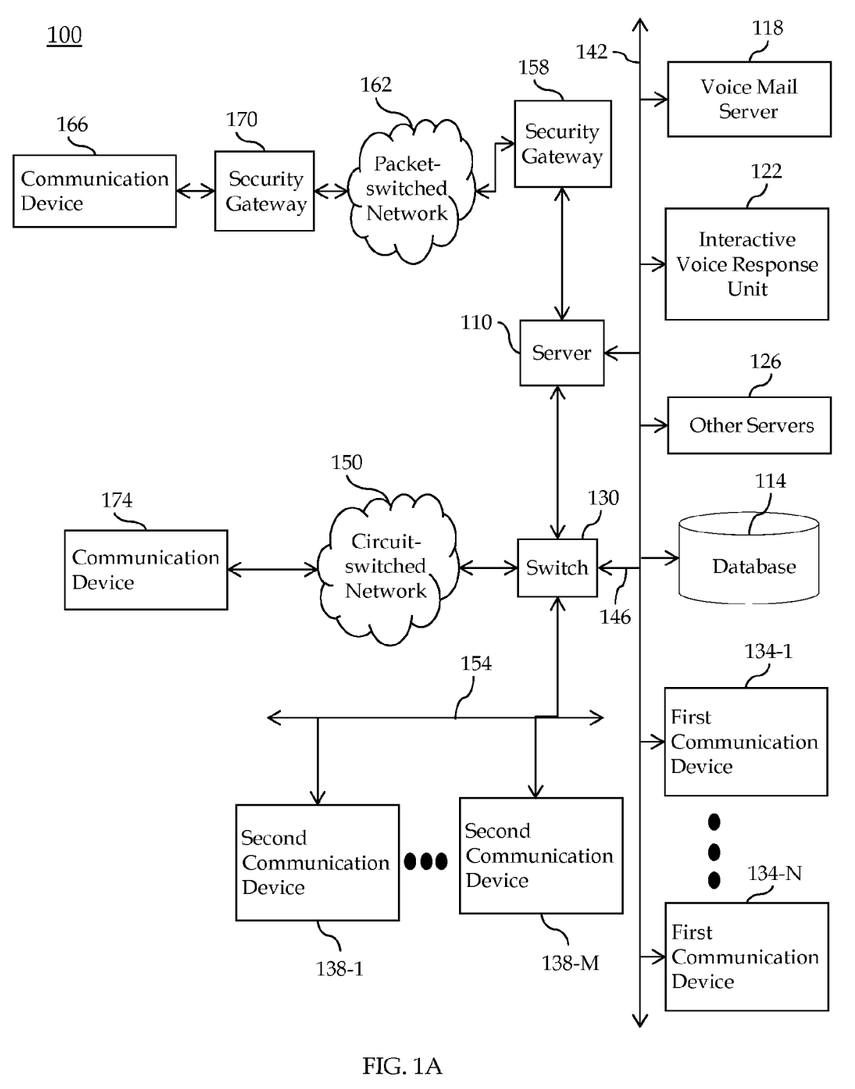
FIG. 1A illustrates a block diagram depicting a contact center, according to an embodiment of the present invention.

FIG. 1A shows an illustrative embodiment of the present invention. A contact center 100 comprises a server 110, a set of data stores or databases 114 containing contact or customer related information, resource or resource related information and other information that may enhance the value and efficiency of the contact processing, and a plurality of servers, namely a voice mail server 118, an Interactive Voice Response unit (e.g., IVR) 122, and other servers 126, a switch 130, a plurality of working resources operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). In another embodiment of the present invention, the customer and resource related information may be replicated over multiple repositories.

The servers may be connected via optional communication lines 146 to the switch 130. As will be appreciated, the other servers 126 may also include a scanner (which is normally not connected to the switch 130 or Web Server), VoIP software, video call software, voice messaging software, an IP voice server, a fax server, a web server, an email server, and the like. The switch 130 is connected via a plurality of trunks to a circuit-switched network 150 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. In an embodiment of the present invention, the security gateway 158 (as shown in FIG. 1A) may be Avaya Inc.'s, G700 Media Gateway™ and may be implemented as hardware such as via an adjunct processor (as shown) or as a chip in the server 110.

The switch 130 and/or server 110 may be any architecture for directing contacts to one or more communication devices. In some embodiments of the present invention, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX) based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya, or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

The first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched devices. Each of the second communication devices 138-1-M corresponds to one of a set of internal extensions Ext-1-M, respectively. The second communication devices 138-1-M may include, for example, wired and wireless telephones, PDAs, H.320 videophones and conferencing units, voice messaging and response units, traditional computer telephony adjuncts, and any other communication devices.

It should be noted that embodiments of the present invention do not require any particular type of information transport medium between switch, or server and first and second communication devices, i.e., embodiments of the present invention may be implemented with any desired type of transport medium as well as combinations of different types of transport channels.

The packet-switched network 162 may be any data and/or distributed processing network, such as the Internet. The packet-switched network 162 typically includes proxies (not shown), registrars (not shown), and routers (not shown) for managing packet flows.

The packet-switched network 162 as shown in FIG. 1A is in communication with a first communication device 166 via a security gateway 170, and the circuit-switched network 150 with an external second communication device 174.

In one configuration, the server 110, the packet-switched network 162, and the first communication devices 134-1-N are Session Initiation Protocol (SIP) compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized the configuration of the switch 130, the server 110, user communication devices, and other elements as shown in FIG. 1A is for purposes of illustration only and should not be construed as limiting embodiments of the present invention to any particular arrangement of elements.

Further, the server 110 is notified via the LAN 142 of an incoming service request or work item by the communications component (e.g., switch 130, a fax server, an email server, a web server, and/or other servers) receiving the incoming service request as shown in FIG. 1A. The incoming service request is held by the receiving telecommunications component until the server 110 forwards instructions to the component to forward or route the contact to a specific contact center resource, such as the IVR unit 122, the voice mail server 118, and/or first or second telecommunication device 134-1-N, 138-1-M associated with a selected resource.

Figure 1B:
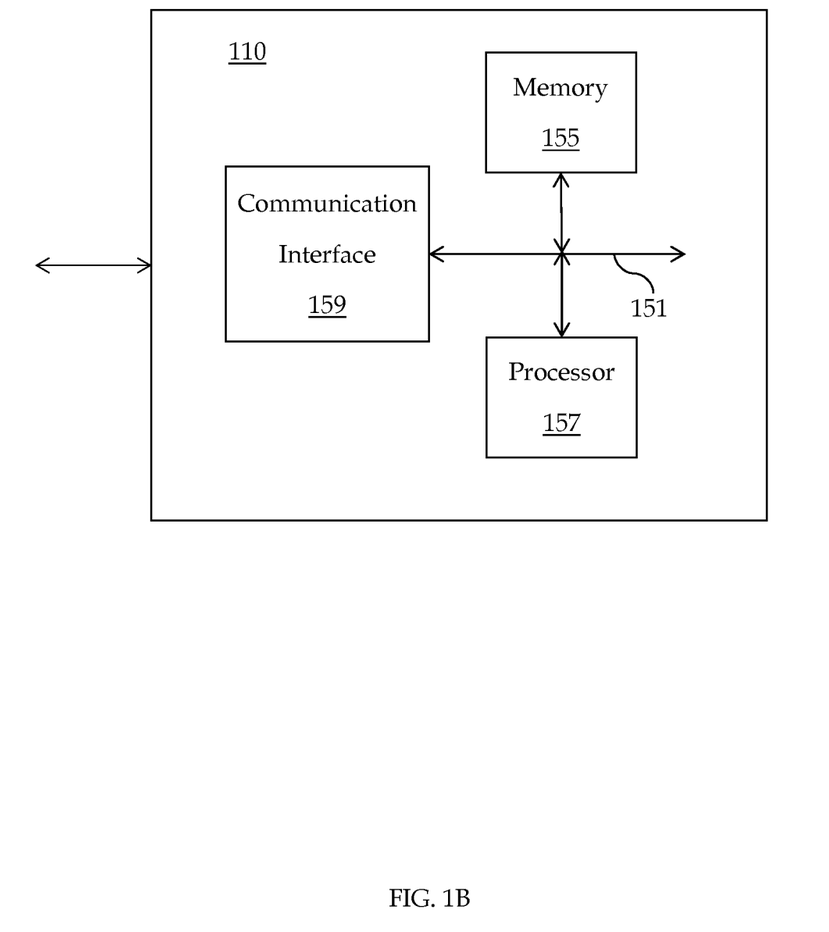
FIG. 1B illustrates a high level hardware abstraction of a block diagram of a server, according to an embodiment of the present invention.

FIG. 1B illustrates at a relatively high-level hardware abstraction of a block diagram of a server such as the server 110, in accordance with an embodiment of the present invention. The server 110 may include an internal communication interface 151 that interconnects a processor 157, a memory 155 and a communication interface circuit 159. The communication interface circuit 159 may include a receiver and transmitter (not shown) to communicate with other elements of the contact center 100 such as the switch 130, the security gateway 158, the LAN 142, and so forth. By use of programming code and data stored in the memory 155, the processor 157 may be programmed to carry out various functions of the server 110.

Although embodiments are discussed with reference to client-server architecture, it is to be understood the principles of embodiments of the present invention apply to other network architectures. For example, embodiments of the present invention apply to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, embodiments of the present invention do not require the presence of packet- or circuit-switched networks.

Figure 2:
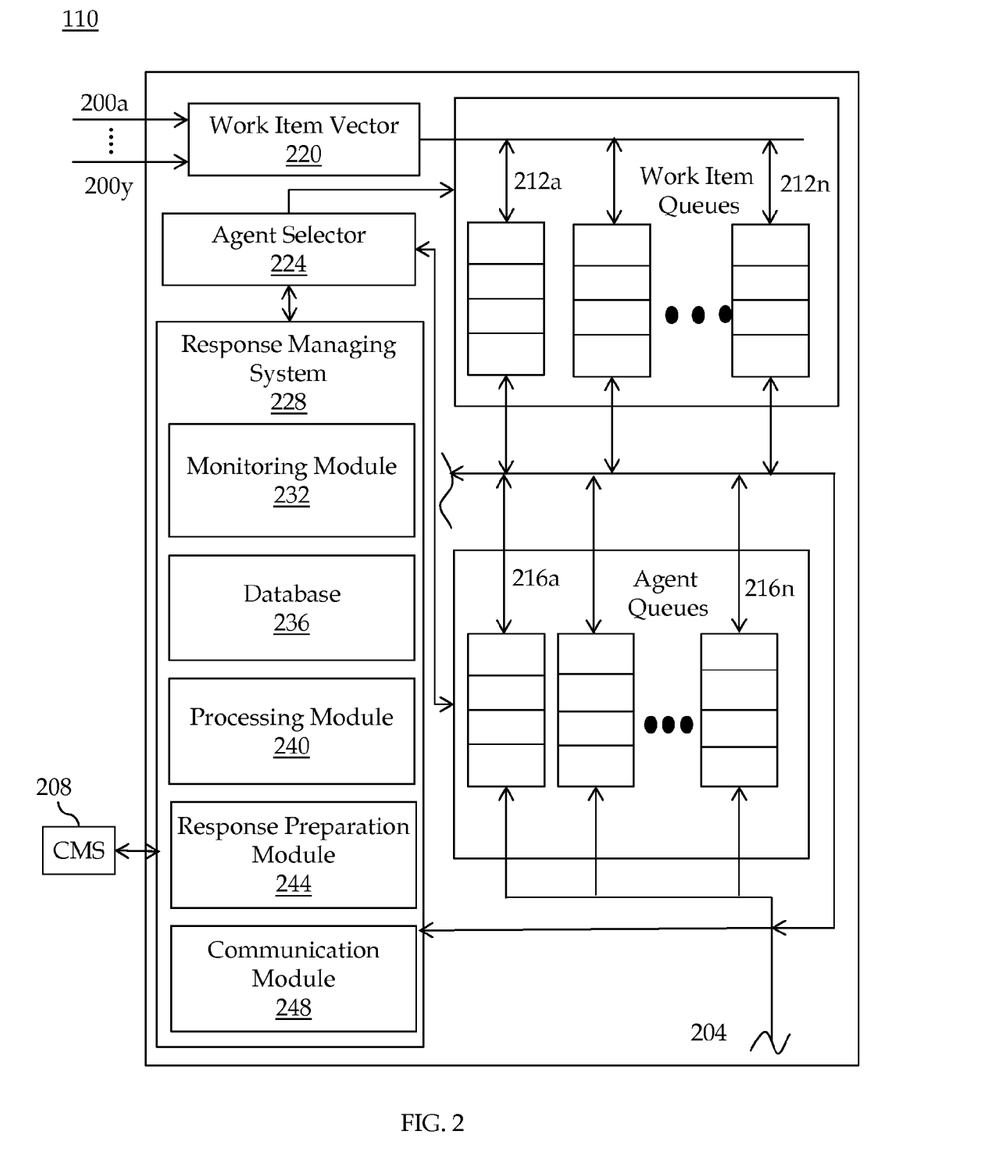
FIG. 2 illustrates a functional block diagram of the server that may be used in the contact center, according to an embodiment of the present invention.

Referring to FIG. 2, one possible configuration of the server 110 is depicted at a relatively high level of functional abstraction, according to an embodiment of the present invention. The server 110 is in communication with a plurality of contact or customer communication lines 200a-y (which may be one or more trunks, phone lines, etc.) and an resource communication line 204 (which may be a voice-and-data transmission line such as the LAN 142 and/or a circuit switched voice line). The server 110 may include Avaya Inc.'s Operational Analyst™ (OA) with On-Line Analytical Processing (OLAP) technology or a Call Management System (CMS) 208 that gathers contact records. OA and CMS will hereinafter be referred to jointly as CMS 208.

As shown in FIG. 2, among the data stored in the server 110 is a set of contact or work item queues 212a-n and a separate set of resource queues 216a-n. Each contact queue 212a-n corresponds to a different set of resource queues, as does each resource queue 216a-n. Conventionally, contacts are prioritized and either are queued in individual ones of the contact queues 212a-n in their order of priority or are queued in different ones of a plurality of contact queues 212a-n that correspond to a different priority. Likewise, each resource's queues are prioritized according to his or her level of expertise or skill in that queue, and resources are queued in either individual ones of resource queues 216a-n in their order of expertise level, or in different ones of a plurality of resource queues 216a-n that correspond to a queue and each one of which corresponds to a different expertise level. In an embodiment of the present invention, the resource queue 216a-n may include a set of reserve resources queue in the contact center 100.

According to an embodiment of the present invention, included among the control programs in the server 110 is a work item vector 220. Contacts or calls incoming to the contact center 100 are assigned by the work item vector 220 to different work item queues 212a-n based upon a number of predetermined criteria, including a customer's identity, customer needs, contact center needs, current contact center queue lengths, a customer value, and an resource skill that is required for proper handling of the contact. Resources that are available for handling work items are assigned to the resource queues 216a-n based upon the skills that they possess. A resource may have multiple skills, and hence may be assigned to multiple resource queues 216a-n simultaneously. Furthermore, a resource may have different levels of skill expertise (e.g., skill levels 1-N in one configuration or merely primary skill levels and secondary skill levels in another configuration), and hence may be assigned to different resource queues 216a-n at different expertise levels.

In one configuration, the contact center 100 is operated by a contract operator (e.g., a supervisor or a manager of the contact center 100), and each of the work item queues 212a-n, and possibly each of the resource queues 216a-n, corresponds to a different client. Each client may have a separate Service Level Agreement (SLA) or other type of performance measurement agreement with the contract operator regarding performance expectations, goals, requirements or specifications for the client's respective queue(s).

Further, embodiments in accordance with the present invention may include, among the programs executing on the server 110, a resource selector 224 and a response managing system 228. The resource selector 224 and the response managing system 228 are stored either in the main memory or in a peripheral memory (e.g., disk, CD ROM, etc.) or some other computer-readable medium of the contact center 100. Further, the resource selector 224 monitors the occupants of the work item and resource queues 212a-n and 216a-n, respectively, and contact center objectives, rules, and policies and select resources to service work items.

The resource selector 224 distributes and connects these work items to communication devices of available resources based on the predetermined criteria noted above. When the resource selector 224 forwards a contact (or first work item) to an resource, the resource selector 224 also forwards customer-related information from the database 114 to the resource's desktop or computer work station for previewing and/or viewing (such as by a pop-up display) to enable the resource for providing better services to the customer. Depending on the contact center configuration, the resource selector 224 may reallocate the work items to the resources of the contact center 100. The resources process the contacts or work items sent to them by the resource selector 224.

In an embodiment of the present invention, the resource and their associated data are maintained and updated in the database 114 of the contact center 100. Upon the completion of handling a work item, a generator (not shown) collects selected metrics for the work item. These metrics may include skills involved in servicing the work item, an identifier of a servicing resource, contact duration, a transaction or contact type (e.g., sale, information request, complaint, etc.), time-of-day, result of the contact (e.g., type of sale, number of units sold, an average revenue generated, etc.), and so forth. The metrics along with other statistics is typically gathered by the CMS 208.

According to an embodiment of the present invention, the response managing system 228 includes certain modules, such as, but is not restricted to, a monitoring module 232, a database 236, a processing module 240, a response preparation module 244, and a communication module 248. In some embodiments, one or more of the monitoring module 232, the database 236, the processing module 240, the response preparation module 244 and the communication module 248 may be implemented by one or more software processes running on the server 110. The server 110 may implement one or more software processes by use of the processor 157 being suitably programmed by use of software instructions stored in the memory 155 coupled to the processor 157.

The monitoring module 232 may monitor parameters associated with a communication session, according to an embodiment of the present invention. The parameters may include, but not restricted to, a type of communication session, customer information, query, and so forth. Examples of the type of communication session may include, but not limited to, a voice call, a video call, an email communication, Short Messaging Service (SMS) communication, instant messaging (IM), web chat conversation, blog on a website of an organization or an enterprise, group chat on a social networking website, a post on a social networking page or a social network group and so forth.

The monitoring module 232 may monitor customer information, in an embodiment of the present invention. In one embodiment of the present invention the customer information may include a name, a contact address, an email address, a telephone number, a social networking username, a customer identity number and so forth. In various embodiments of the present invention, the customer information may be extracted by retrieving social networking profiles of the customer, customer profile in contact center 100, or a combination thereof. The social networking profile of the customer may include, but not restricted to, the customer's personal information, contact information, educational background, business contacts, work history, likes, hobbies, favorite sport teams, and so forth. The customer profile may include, but not restricted to, a call log, a frequency of conversations, history of queries, feedbacks, ratings, and so forth. In another embodiment of the present invention, the customer information may further include a type of customer. The type of customer may include, but not restricted to a platinum customer, a gold customer, a silver customer, and so forth, wherein the platinum customer generates higher revenue for the contact center 100 than the gold customer and the silver customer. For example, the gold customer is a customer that generates higher revenue than the silver customer. The customer information may further include the customer's device attributes, in an embodiment of the present invention. The attributes may include, but not restricted to, Internet Protocol (IP) address, Media Access Control (MAC) address, display capabilities, location information, and so forth.

Further, the monitoring module 232 may monitor a query from the customer during the communication session, in an embodiment of the present invention. The query may refer to, an inquiry, an acknowledgement, a statement, and so forth. The monitoring module 232 may monitor, words, phrases, sentences, special characters or a combination within the query. The monitoring module 232 may transfer the monitored parameters to database 236 of the contact center.

In an embodiment of the present invention, the database 236 may relate to the database 114 of the contact center 100. In another embodiment of the present invention, the database 236 may relate to a third-party hosted database. The database 236 may store the monitored parameters of the communication session, according to an embodiment of the present invention.

The processing module 240 may process the stored parameters to determine characteristics of the customer, in an embodiment of the present invention. The characteristics of the customer may include a personality type, a conversation style, interests, demographics, and so forth, according to an embodiment of the present invention. In another embodiment of the present invention, the processing module 240 may process the stored parameters to determine a query type, query content, and query context. In an embodiment of the present invention, the processing module 240 may process the stored query to determine characteristics of the customer. The processing module 240 may process the stored query based on conventional techniques of Natural Language Processing (NLP), sentiment analysis, text analytics, and so forth, for determining the characteristics of the customer.

In an embodiment of the present invention, the processing module 240 may determine a query type by processing the query. The query type may include, but not restricted to a speech or voice based query, text based query, and so forth. In an exemplary scenario of the present invention, a customer may ask a question via an email communication, where it is determined that the query is text-based. In another exemplary scenario, a customer may ask a question in a voice call session with a resource, where it is determined that the query is voice-based.

Further, the processing module 240 may determine the query content by parsing the stored query, according to an embodiment of the present invention. The query content may include, but not restricted to, words, phrases, sentences, special characters and so forth. The processing module 240 may extract special characters or symbols from the query. The processing module 240 may further identify a repetition of words, phrases, sentences, and so forth. The processing module may further identify patterns and trends of words, phrases or sentences within the query. The processing module 240 may eliminate the extracted special characters or symbols from the query to further process the query. The processing module 240 may eliminate redundancies of words, phrases or sentences within the query to further process the query. In an embodiment of the present invention, the processing module 240 may determine the query context by extracting keywords. The query context may include, but not restricted to, product support, sales, transactions, complaints, and so forth.

The processing module 240 may determine the characteristics of the customer by processing the query to identify a sentiment associated with a word, according to an embodiment of the present invention. The sentiment may include, but not restricted to, positive, negative, neutral, and so forth. The positive sentiment may indicate the customer is happy or satisfied from customer services provided by the contact center 100. Examples of the positive sentiment may be, but is not restricted to, fulfilled, glad, optimistic, and so forth. The negative sentiment may indicate that the customer is unhappy and unsatisfied from customer services provided by the contact center 100. Examples of the negative sentiment may be, but is not restricted to, frustrated, angry, irritated, and so forth. The neutral sentiment may indicate that the customer is not fully satisfied or happy but is not fully unsatisfied or unhappy from the customer services provided by the contact center 100.

Further, the processing module 240 may determine characteristics of the customer by processing the stored information extracted from social networking profiles, according to an embodiment of the present invention. The processing module 240 may determine characteristics of the customer by processing the extracted information from pre-stored customer profiles in databases of contact center 100. The information may include, but not restricted to, likes, interests, hobbies, favorite movies, favorite television shows, favorite sports, group memberships, followed social networking pages, places visited, event participations, posts on social networking pages, status updates, and so forth. The information may further include, call log, previous queries, feedbacks, surveys, and so forth. In an embodiment of the present invention, the processing module 240 may analyze the information to determine a personality type of the customer. The personality type may include, but not restricted to, Myers-Briggs personality types. The Myers-Briggs personality type refers to extrovert, introvert, sensing, intuitive, thinking, feeling, judging, perceiving, or a combination thereof. The processing module 240 may determine the personality type of the customer from a survey or a personality test conducted by a third party. In another embodiment of the present invention, the processing module 240, may analyze the information to determine a conversation style of the customer. The conversation style may include, but not restricted to, direct, indirect, elaborate, succinct, contextual, personal, instrumental, affective, or a combination thereof. In yet another embodiment of the present invention, the processing module 240 may further analyze the extracted information to determine demographics associated with the customer. In yet another embodiment of the present invention, the processing module 240 may further analyze the extracted information to determine interests of the customer.

In another embodiment of the present invention, the processing module 240 may determine the personality type of the customer from body language, facial expressions or a combination thereof, in a video call. The processing module 240 may use conventional techniques to determine facial expressions of the customer.

The response preparation module 244 may prepare a response based on the determined characteristics of the customer. In an embodiment of the present invention, the response preparation module 244 may select a template of a response out of a pool of responses stored in the database 236 of the contact center 100 based on the determined characteristics of the customer. The responses stored in the database 236 may be categorized based on known characteristics. In an exemplary scenario, a response template 'A' and a response template 'B' stored in the database 236 of contact center 100 may complement to one personality type and a response template 'C' and a response template 'D' may complement another personality type. In another embodiment of the present invention, the response preparation module 244 may allow the resource or a supervisor of the resource to further modify the prepared response. The response preparation module 244 may present suggestions to the resource for modifying the prepared response. The suggestions for modifying the response may include, but not restricted to, permitted words or phrases or sentences, restricted words or phrases or sentences, and so forth. The response preparation module 244 may receive an input from the resource for modifying the response. In an exemplary scenario, the response preparation module 244 may suggest a resource to write "Research at University of California suggests a solution . . . " instead of writing "We here believe a possible solution could be . . . " based on the determined personality type of the customer. In another exemplary scenario of the present invention, the resource may be advised to introduce or present a joke in a conversation with the customer. Further, the response preparation module 244 may prompt the resource for usage of negative words in preparing responses and suggest usage of positive words in response preparation. In yet another embodiment of the present invention, the response preparation module 244 may prepare a script partially or completely for the resource. According to an embodiment of the present invention, the response preparation module 248 may automatically modify the prepared response even after submission of the response by the resource.

The communication module 248 may facilitate a communication session between a resource and a customer, in an embodiment of the present invention. In another embodiment of the present invention, the communication module may receive queries from the customer. In yet another embodiment of the present invention, the communication module 248 may transmit the prepared response to the customer.

Figure 3:
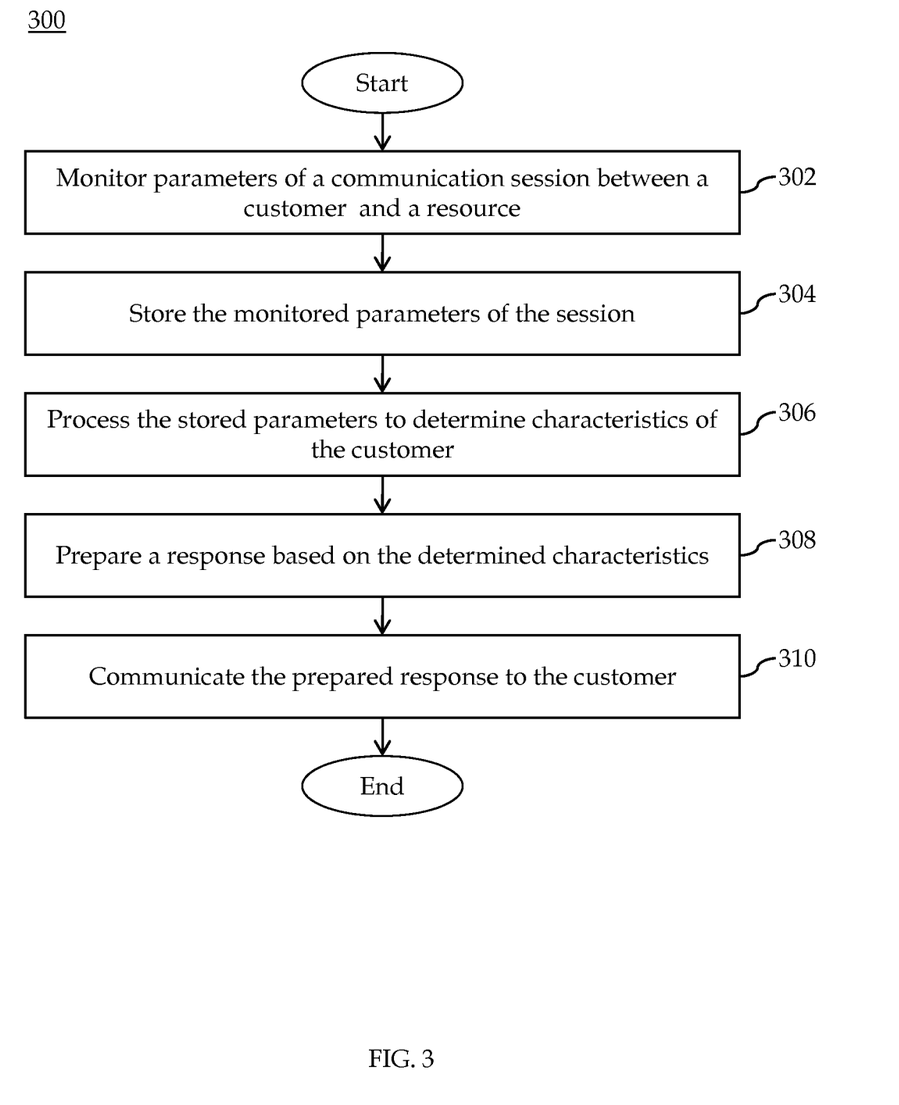
FIG. 3 depicts a flowchart of a method for managing responses between a customer and a resource in a communication session in an enterprise, according to an embodiment of the present invention.

FIG. 3 depicts a flowchart of a method for managing responses between a customer and a resource in a communication session in an enterprise, according to an embodiment of the present invention.

At step 302, a response managing system 228 monitor parameters associated with the communication session between the customer and the resource, according to an embodiment of the present invention. The parameters associated with the communication session may include, but not restricted to, type of communication session, customer information, query, and so forth. The type of communication session may include, but not restricted to, a voice call, a video call, an email communication, Short Messaging Service (SMS) communication, instant messaging (IM), web chat conversation, blog on a website of an organization or an enterprise, group chat on a social networking website, a post on a social networking page or a social network group, and so forth. The customer information may include, information from social networking profiles, information from customer profile, customer type, customer device attributes, and so forth. The resource managing system 228 may monitor a query to extract words, phrases, sentences, special characters or a combination within the query. The query may refer to, an inquiry, an acknowledgement, a statement, and so forth.

At step 304, the response managing system 228 may store the monitored parameters in a database, according to an embodiment of the present invention. In an embodiment of the present invention, the database may relate to the database 114 of the contact center.

Next, at step 306, the response managing system 228 processes the stored parameters to determine characteristics of the customer. The characteristics of the customer may include, but not restricted to, personality type, conversation style, demographics, interests, and so forth. The personality types of the customer may include, but not restricted to, Myers-Briggs personality types. The Myers-Briggs personality type refers to extrovert, introvert, sensing, intuitive, thinking, feeling, judging, perceiving, or a combination thereof. The conversation style of the customer may include, but not restricted to direct, indirect, elaborate, succinct, contextual, personal, instrumental, affective, or a combination thereof. In an embodiment of the present invention, the characteristics of the customer may be determined by processing the query to extract positive, negative or neutral words. In another embodiment of the present invention, the characteristics type of the customer may be determined by processing extracted information from social networking profiles of the customer. In yet another embodiment of the present invention, the characteristics of the customer may be determined by using conventional techniques of Natural Language Processing (NLP), text analytics, sentiment analysis, and so forth. In yet another embodiment of the present invention, the characteristics of the customer may be determined by using facial expressions, body language, voice words, or a combination thereof in a video call session with the resource. In an embodiment of the present invention, the characteristics of the present invention may be determined by results of third party personality tests taken by the customer, participation in a survey, and so forth. In another embodiment of the present invention, the characteristics of the customer may be determined in real time.

At step 308, the response managing system 228 prepares a response based on the determined characteristics, according to an embodiment of the present invention. In an embodiment of the present invention, the response may be prepared by selecting a response template out of a pool of response templates stored in the database 236 or database 114 of the contact center 100. The responses stored in the database 236 may be categorized based on known characteristics. In an exemplary scenario, a response template 'A' and a response template 'B' stored in the database 236 of contact center 100 may complement to one personality type and a response template 'C' and a response template 'D' may complement another personality type. In another embodiment of the present invention, the response may be prepared by allowing the resource or a supervisor of the resource to further modify the prepared response. In yet another embodiment of the present invention, the response may be prepared by presenting suggestions to the resource for modifying the prepared response. In yet another embodiment of the present invention, the response may be prepared by prompting the resource for usage of negative words in preparing responses and suggest usage of positive words in response preparation. In yet another embodiment of the present invention, the response may be prepared by automatically modifying a response even after submission by the resource.

Next, at step 310, the response managing system 228 communicates the prepared response to the customer, according to an embodiment of the present invention. The response may be communicated by transmitting the prepared response to the customer.

Figure 4:
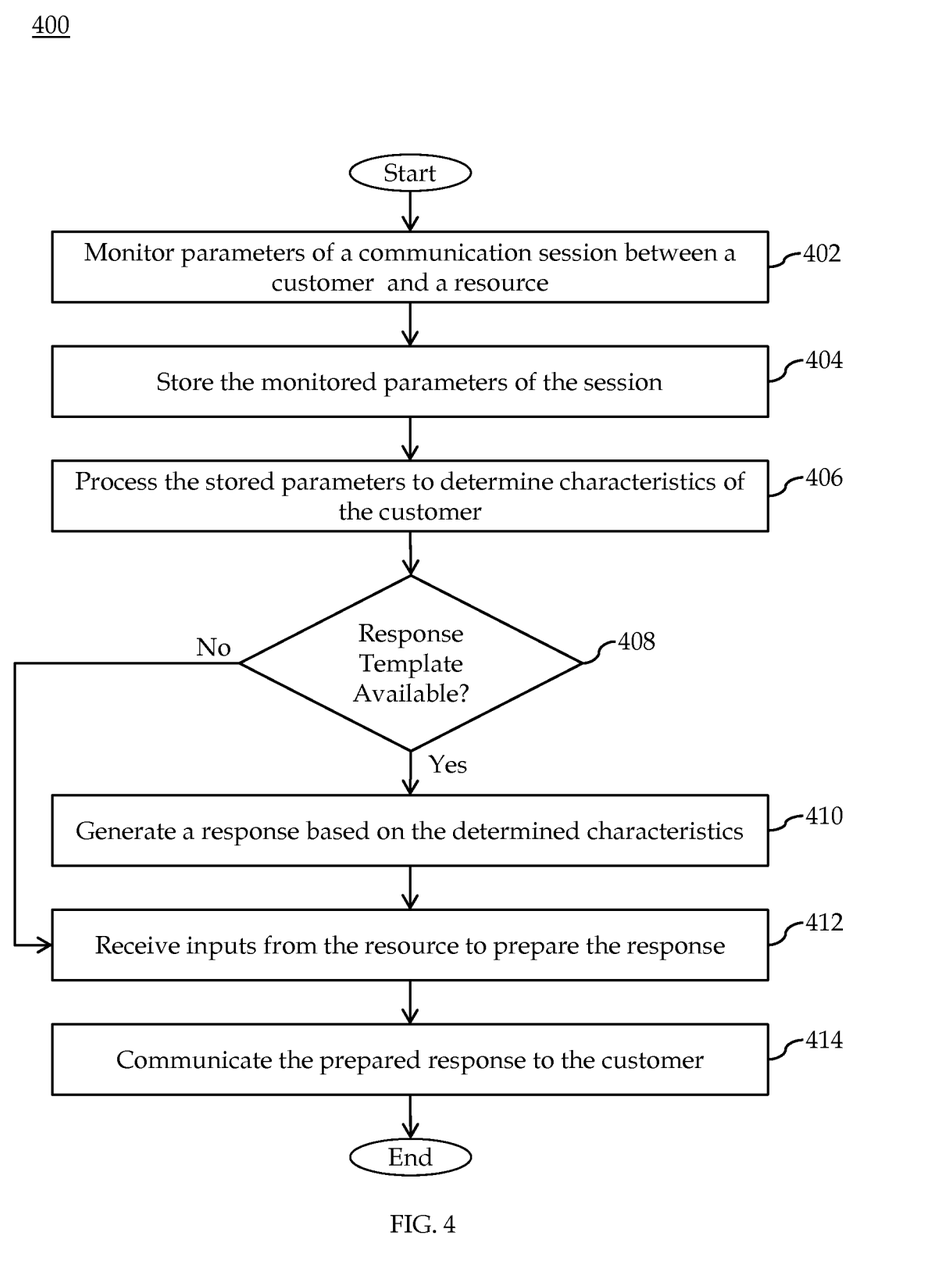
FIG. 4 depicts a flowchart of a method for managing responses between a customer and a resource in a communication session in an enterprise, according to another embodiment of the present invention.

FIG. 4 depicts a flowchart of a method 400 for managing responses between a customer and a resource in a communication session in an enterprise, according to another embodiment of the present invention.

At step 402, a response managing system 228 monitor parameters associated with the communication session between the customer and the resource, according to an embodiment of the present invention. The parameters associated with the communication session may include, but not restricted to, type of communication session, customer information, query, and so forth. The type of communication session may include, but not restricted to, a voice call, a video call, an email communication, Short Messaging Service (SMS) communication, instant messaging (IM), web chat conversation, blog on a website of an organization or an enterprise, group chat on a social networking website, a post on a social networking page or a social network group, and so forth. The customer information may include, information from social networking profiles, information from customer profile, customer type, customer device attributes, and so forth. The resource managing system 228 may monitor a query to extract words, phrases, sentences, special characters or a combination within the query. The query may refer to, an inquiry, an acknowledgement, a statement, and so forth.

At step 404, the response managing system 228 may store the monitored parameters in a database, according to an embodiment of the present invention. In an embodiment of the present invention, the database may relate to the database 114 of the contact center.

Next, at step 406, the response managing system 228 processes the stored parameters to determine characteristics of the customer. The characteristics of the customer may include, but not restricted to, personality type, conversation style, demographics, interests, and so forth. The personality types of the customer may include, but not restricted to, Myers-Briggs personality types. The Myers-Briggs personality type refers to extrovert, introvert, sensing, intuitive, thinking, feeling, judging, perceiving, or a combination thereof. The conversation style of the customer may include, but not restricted to direct, indirect, elaborate, succinct, contextual, personal, instrumental, affective, or a combination thereof. In an embodiment of the present invention, the characteristics of the customer may be determined by processing the query to extract positive, negative or neutral words. In another embodiment of the present invention, the characteristics type of the customer may be determined by processing extracted information from social networking profiles of the customer. In yet another embodiment of the present invention, the characteristics of the customer may be determined by using conventional techniques of Natural Language Processing, text analytics, sentiment analysis, and so forth. In yet another embodiment of the present invention, the characteristics of the customer may be determined by using facial expressions, body language, voice words, or a combination thereof in a video call session with the resource. In an embodiment of the present invention, the characteristics of the present invention may be determined by results of third party personality tests taken by the customer, participation in a survey, and so forth. In another embodiment of the present invention, the characteristics of the customer may be determined in real time.

Thereafter, at step 408, the response managing system 228 determines whether a response template that complements the determined characteristics of the customer is available in the database 236 of the contact center 100. If it is determined that the template is available then the method 400 proceeds to step 410. If it is determined that the template is not available then the method proceeds to step 412.

At step 410, the response managing system 228 prepares a response based on the determined characteristics, according to an embodiment of the present invention. In an embodiment of the present invention, the response may be prepared by selecting a response template out of a pool of response templates stored in the database 236 or database 114 of the contact center 100. The responses stored in the database 236 may be categorized based on known characteristics.

At step 412, the response managing system 228, receives inputs from the resource to prepare the response, according to an embodiment of the present invention. In another embodiment of the present invention, the response may be prepared by presenting suggestions to the resource for preparing the response. In yet another embodiment of the present invention, the response may be prepared by prompting the resource for usage of negative words in preparing responses and suggest usage of positive words in response preparation. In yet another embodiment of the present invention, the response may be modified automatically even after submission of the response by the resource.

Further, at step 414, the response managing system 228 communicates the prepared response to the customer, according to an embodiment of the present invention. The response may be communicated by transmitting the prepared response to the customer.

Figure 5:
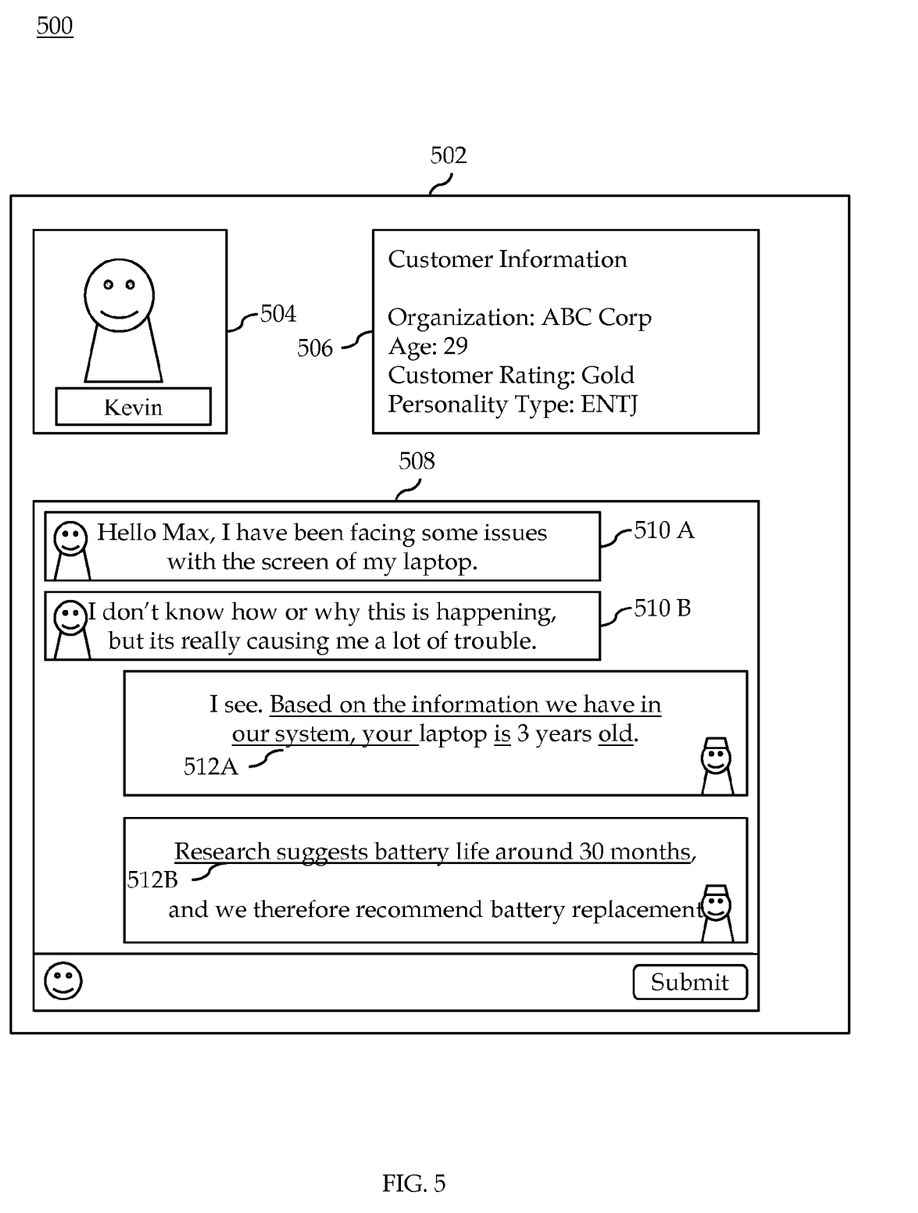
FIG. 5 depicts an exemplary user interface with a response for the customer, according to an embodiment of the present invention.

FIG. 5 depicts an exemplary user interface with a response for the customer, according to an embodiment of the present invention. In an exemplary scenario, an ongoing web chat communication between a customer and a resource of the contact center 100 is shown. An interface 502 is presented on a display of a device used by the resource. The interface 502 includes various portions 504, 506 and 508. The portion 504 displays the customer's name and a profile picture. The portion 506 displays information related to the customer, for example but not limited to, work organization, age, customer rating, personality type, etc. The portion 508 displays the web chat communication between the customer and the resource. The web chat portion 508 includes incoming messages 510A and 510B from the customer and transmitted responses from the resource.

The response managing system 228 receives a query depicted by 510A and 510B from the customer. The response managing system 228 monitors parameters associated with the customer in the communication session such as a social networking profile or a customer profile in database 114 to obtain information related to the customer. The response managing system 228 further monitors the query from the customer. The response managing system 228 stores the monitored parameters in the database 236. Further, the monitored parameters are processed to determine a personality type or conversation style associated with the customer. The response managing system 228 processes the query by using conventional techniques of Natural Language Processing (NLP) or sentiment analysis to determine a personality type of the customer. The response managing system 228 further extracts the customer's information from the stored social networking profiles or customer profile to determine a personality type of the customer. Cumulatively, the response managing system 228 determines the personality type of customer as Extrovert-Intuitive-Thinking-Judging (ENTJ). Further, the response managing system 228 presents one or more response templates 512A and 512B (underlined portion of response) stored in the database 114, based on pre-defined rules. The response managing system 228 further allows the resource to prepare the response by adding comments or words or phrases (non-underlined portion). The responses prepared by the resource are submitted and communicated to the customer via the interface 502.

The exemplary embodiments of this present invention have been described in relation to a contact center. However, to avoid unnecessarily obscuring the present invention, the preceding description omits a number of known structures and devices. This omission is not to be construed as a limitation of the scope of the present invention. Specific details are set forth by use of the embodiments to provide an understanding of the present invention. It should however be appreciated that the present invention may be practiced in a variety of ways beyond the specific embodiments set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, changes, additions, and omissions to this sequence can occur without materially affecting the operation of embodiments of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with embodiments of the present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, it is not limited to such standards and protocols. Other similar standards and protocols not mentioned herein are in existence and considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. It is not intended to limit the present invention to the form or forms disclosed herein. In the foregoing Detailed Description, for example, various features of the present invention are grouped together in one or more embodiments, configurations, or aspects for the purpose of streamlining the disclosure. The features of the embodiments, configurations, or aspects may be combined in alternate embodiments, configurations, or aspects other than those discussed above. This method of disclosure is not to be interpreted as reflecting an intention the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A response managing system, for managing one or more responses provided by a resource to one or more queries received from a customer during at least one communication session in an enterprise, the system comprising:
    a memory;
    a processor coupled to the memory, wherein the processor executes executable instructions stored in the memory to:
        monitor one or more parameters associated with the at least one communication session;
        store the one or more monitored parameters in a database;
        process the one or more stored parameters to determine one or more characteristics of the customer;
        based on the one or more determined characteristics of the customer, select one or more response templates from a plurality of response templates;
        based on the one or more selected response templates, prepare at least one of the one or more responses provided by the resource to the customer; and
        modify during the at least one communication session, the one or more prepared responses based on at least one input received from the resource.

2. The system of claim 1, wherein the one or more communication sessions is one of a voice call, a web chat, an email communication, a video call, or a combination thereof.

3. The system of claim 1, wherein the processor when executing the executable instructions:
    queries one or more social networking websites for retrieving one or more profiles associated with the customer.

4. The system of claim 1, wherein the one or more characteristics comprise a personality type, a conversation style, an interest, demographics, or a combination thereof.

5. The system of claim 4, wherein the personality type is extrovert, introvert, sensing, intuitive, thinking, feeling, judging, perceiving, or a combination thereof.

6. The system of claim 1, wherein the processor when executing the executable instructions:
communicates the one or more modified prepared responses to the customer.

7. A computer-implemented method for managing one or more responses provided by a resource to one or more queries received from a customer during at least one communication session in an enterprise, the method comprising:
monitoring, by a processor of the enterprise, one or more parameters associated with the at least one communication session;
storing, by the processor of the enterprise, the one or more monitored parameters in a database;
processing, by the processor of the enterprise, the one or more stored parameters to determine one or more characteristics of the customer;
selecting, by the processor of the enterprise, based on the one or more determined characteristics of the customer, one or more response templates from a plurality of response templates;
preparing, by the processor of the enterprise, based on the one or more selected response templates, at least one of the one or more responses provided by the resource to the customer; and
modifying, by the processor of the enterprise, during the at least one communication session, the one or more prepared responses based on at least one input received from the resource.

8. The method of claim 7, wherein the at least one communication session is one of a voice call, a web chat, an email communication, a video call or a combination thereof.

9. The method of claim 7, further comprising:
querying, by the processor of the enterprise, one or more social networking websites for retrieving one or more profiles associated with the customer.

10. The method of claim 7, wherein the one or more characteristics comprise a personality type, a conversation style, an interest, demographics, or a combination thereof.

11. The method of claim 10, wherein the personality type is extrovert, introvert, sensing, intuitive, thinking, feeling, judging, perceiving, or a combination thereof.

12. The method of claim 7, further comprising:
communicating the one or more modified prepared responses to the customer.

13. A computer-implemented method for managing one or more communication sessions in an enterprise, the method comprising:
receiving, by a processor of the enterprise, one or more queries from a customer in the one or more communication sessions;
monitoring, by the processor of the enterprise, one or more parameters associated with the one or more queries;
storing, by the processor of the enterprise, the one or more monitored parameters;
processing, by the processor of the enterprise, the one or more stored parameters to determine at least one personality type of the customer;
preparing, by the processor of the enterprise, one or more responses based on the one or more determined personality types;
modifying, by the processor of the enterprise, during the at least one communication session, the one or more prepared responses based on at least one input received from the resource; and
transmitting, by the processor of the enterprise, the one or more prepared responses to the customer.

14. The method of claim 13, further comprising:
querying, by the processor of the enterprise, one or more social networking websites for retrieving one or more profiles associated with the customer.

15. The method of claim 13, wherein the personality type is extrovert, introvert, sensing, intuitive, thinking, feeling, judging, perceiving, or a combination thereof.

* * * * *

UNITED STATES PATENT AND TRADEMARK OFFICE
CERTIFICATE OF CORRECTION

| | |
|---|---|
| PATENT NO. | : 9,525,776 B2 |
| APPLICATION NO. | : 14/590330 |
| DATED | : December 20, 2016 |
| INVENTOR(S) | : Tony McCormack, Neil O'Connor and John McGreevy |

It is certified that error appears in the above-identified patent and that said Letters Patent is hereby corrected as shown below:

In the Claims

Column 18, Line 53, "modify during the at least one communication session," should read --modify, during the at least one communication session,--

Signed and Sealed this
Twenty-third Day of May, 2017

Michelle K. Lee
*Director of the United States Patent and Trademark Office*